United States Patent
Ieda et al.

(10) Patent No.: US 6,675,597 B2
(45) Date of Patent: Jan. 13, 2004

(54) VEHICLE AIR-CONDITIONING SYSTEM

(75) Inventors: Hisashi Ieda, Nagoya (JP); Toshinobu Homan, Obu (JP); Ken Matsunaga, Kariya (JP); Yuji Takeo, Toyoake (JP); Mitsuyo Oomura, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/429,527

(22) Filed: May 5, 2003

(65) Prior Publication Data
US 2003/0209022 A1 Nov. 13, 2003

(30) Foreign Application Priority Data

May 9, 2002 (JP) ........................................ 2002-134152

(51) Int. Cl.[7] ................................................. B60H 1/32
(52) U.S. Cl. .................... 62/244; 62/228.4; 165/204
(58) Field of Search .......................... 62/239, 244, 236, 62/156, 180, 228.4; 165/42, 43, 204; 236/91 C

(56) References Cited

U.S. PATENT DOCUMENTS

| | | | | |
|---|---|---|---|---|
| 4,737,629 A | * | 4/1988 | Iwama et al. | 250/559.01 |
| 4,757,693 A | * | 7/1988 | Charriau et al. | 62/126 |
| 5,669,231 A | * | 9/1997 | Itoh et al. | 62/210 |
| 5,934,989 A | * | 8/1999 | Yamamoto | 454/156 |
| 6,021,957 A | * | 2/2000 | Takechi et al. | 237/12.3 A |
| 6,029,462 A | * | 2/2000 | Denniston | 62/94 |
| 6,036,594 A | * | 3/2000 | Kwon et al. | 454/156 |
| 6,073,459 A | * | 6/2000 | Iritani | 62/204 |
| 6,201,312 B1 | * | 3/2001 | Shioiri et al. | 290/40 C |
| 6,470,697 B2 | * | 10/2002 | Nakamura et al. | 62/157 |

FOREIGN PATENT DOCUMENTS

| | | |
|---|---|---|
| JP | 56-154310 | 11/1981 |
| JP | 60-206714 | 10/1985 |
| JP | 11-34649 | 2/1999 |
| JP | 02002213270 A * | 7/2002 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

A vehicle air-conditioning system limits electric power used by an electric motor for a compressor in a prescribed fashion that quickly removes fog from the windows when a defroster mode is selected. When the defroster mode is selected, the limit on the electric power used by the electric motor is lifted, and the number of revolutions of the compressor is set to a high level to raise the dehumidifying and cooling capability to quickly remove moisture from the windows.

18 Claims, 8 Drawing Sheets

FIG. 8A
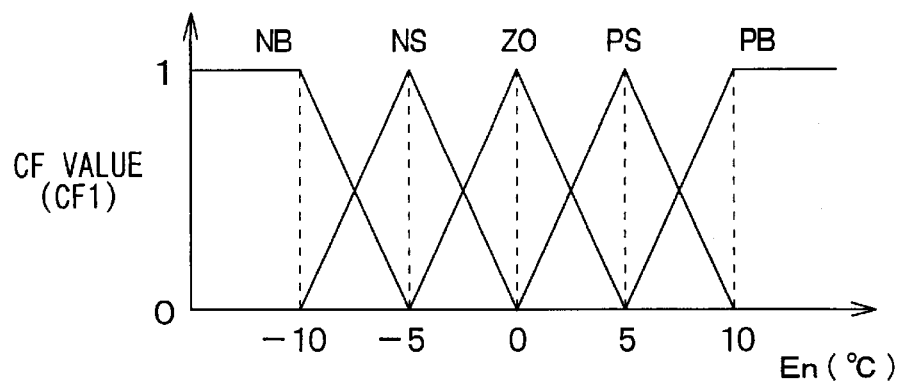
FIG. 8B
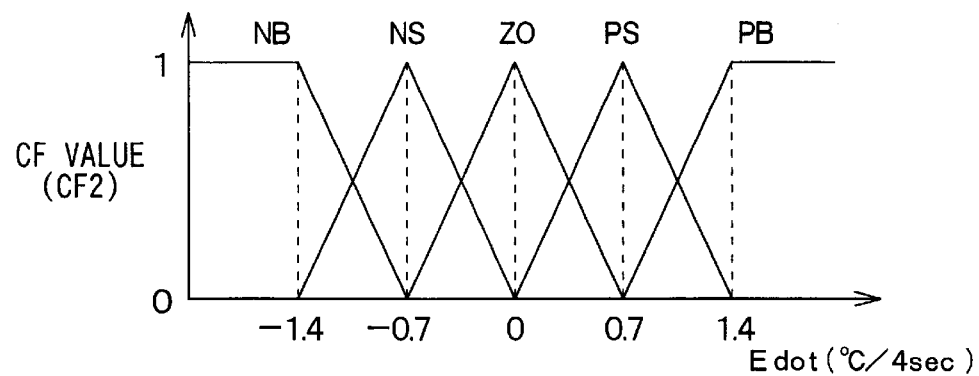
FIG. 9
| Δf (rpm/4sec) | | En | | | | |
|---|---|---|---|---|---|---|
| | | NB | NS | ZO | PS | PB |
| Edot | NB | | | 200 | | |
| | NS | | 80 | 150 | | |
| | ZO | 200 | 100 | 0 | −100 | −200 |
| | PS | 100 | −50 | −80 | −150 | |
| | PB | −50 | −100 | −150 | −200 | |

| EXCESS AMOUNT OF POWER CONSUMED (W) | LESS THAN 100 | 100~300 | MORE THAN 300 |
|---|---|---|---|
| TARGET REVOLUTION NUMBER DECREASE (rpm) | 0 | 200 | 500 | ns of the compressor (23) is increased to the target
VEHICLE AIR-CONDITIONING SYSTEM

CROSS REFERENCE TO RELATED APPLICATIONS

This application is based upon, claims the benefit of priority of, and incorporates by reference, the contents of Japanese Patent Application No. 2002-134152 filed May 9, 2002.

GROUND OF THE INVENTION

1. Field of the Invention

The present invention relates to a vehicle air-conditioning system that drives a compressor for a refrigerating cycle with an electric motor.

2. Description of the Related Art

Generally, in an air-conditioning system, the number of revolutions of the electric motor is controlled to control the amount of refrigerant discharged by the compressor in order to adjust the cooling capability. Electric power consumed by the air-conditioning system is limited based on the air conditioning load for the purpose of saving power (see Japanese Patent Laid-Open Publication No. Hei 11-34649).

In this conventional system, however, when the power consumption by the air-conditioning system is limited and a defroster mode or a foot defroster mode is selected, window fogging cannot be cleared quickly enough in some cases. More specifically, the limit on the power consumption prevents the electric motor and compressor from operating at a high number of revolutions, which causes the dehumidifying and cooling capability to be inadequate, and window fogging cannot be cleared quickly enough.

SUMMARY OF THE INVENTION

The present invention is directed to a solution to the above disadvantage. It is an object of the invention to provide a vehicle air-conditioning system that drives a compressor with an electric motor and is capable of quickly removing fog (moisture) from the window(s) when a defogging blowing mode to blow air to the glass window(s) is selected.

A vehicle air-conditioning system according to a first aspect of the present invention includes a compressor (23) that compresses a refrigerant and discharges the compressed refrigerant, an electric motor (22) that drives the compressor (23), and a heat exchanger (21) that uses the refrigerant for cooling air blown into a vehicle compartment of a vehicle. Electric power used by the electric motor (22) is limited in a prescribed condition. In the system, the limit on the electric power used by the electric motor (22) is lifted when a defogging blowing mode to blow air at the glass windows is selected.

In this way, when the defogging blowing mode is selected, the function of securing the field of view has priority over the power saving function. Therefore, the number of revolutions of the compressor is increased to raise the dehumidifying and cooling capability, so that the fog can quickly be removed from the window.

According to a second aspect of the invention, when the defogging blowing mode is selected, the number of revolutions of the compressor (23) is increased to a target number of revolutions and then held at the target number of revolutions for a prescribed period. In this way, since the number of revolutions of the compressor is held at the target number of revolutions for the prescribed period, the humidifying and cooling capability can be kept at a high level for the period, so that the fog can be removed from the windows even more quickly.

According to a third aspect of the invention, when the defogging blowing mode is selected, the number of revolutions of the compressor (23) is increased to the target number of revolutions at a maximum increasing speed for the number of revolutions. In this way, since the number of revolutions of the compressor is increased to the target number of revolutions at a maximum increasing speed, the humidifying and cooling capability can quickly be raised to a higher level, so that the fog can be removed from the window even more quickly.

According to a fourth aspect of the invention, the prescribed period can be determined based on at least one of the temperature of the outside air, the temperature of the glass windows, and humidity in the vehicle compartment. According to a fifth aspect of the invention, the target number of revolutions is determined based on at least one of the temperature of the outside air, the temperature of the glass windows, and humidity in the vehicle compartment.

A vehicle air-conditioning system according to a sixth aspect of the invention is for use in a hybrid vehicle that includes an engine (1) that generates driving force for driving the vehicle, a generator (2) driven by the engine (1) to generate electricity, a battery (4) charged by the electricity generated by the generator (2), and a driving electric motor (2) fed by the battery (4) to generate driving force for vehicle driving. The air-conditioning system includes a compressor (23) that compresses a refrigerant and discharges the compressed refrigerant, an electric motor (22) for the compressor fed by the battery (4) to drive the compressor (23), and a heat exchanger (21) for cooling air, blown into a vehicular compartment, with the refrigerant. Electric power used by the electric motor (22) for the compressor is limited in a prescribed condition. The limit on the electric power used by the electric motor (22) for the compressor is disregarded when a defogging blowing mode to blow air to the glass windows is selected. In this way, in the vehicle air-conditioning system having an engine and an electric motor for driving, the same effect as in the first aspect can be provided.

According to a seventh aspect of the invention, when the defogging blowing mode is selected, the number of revolutions of the compressor (23) is increased to a target number of revolutions and then kept at the target number of revolutions for a prescribed period. In this way, in the air-conditioning system in the hybrid vehicle having an engine and an electric motor for driving, the same effect as in the second aspect can be provided.

According to an eighth aspect of the invention, when the defogging blowing mode is selected, the number of revolutions of the compressor (23) is increased to the target number of revolutions at a maximum increasing speed for the number of revolution.

In this way, in the air-conditioning system in the hybrid vehicle having an engine and an electric motor for driving, the effect the same as that by the third aspect can be provided.

According to a ninth aspect of the invention, the target number of revolutions is set to a higher level while the engine (1) is operated than while the engine is stopped. Additionally, in the hybrid vehicle, the engine is stopped when the automobile is stopped or when the automobile is driven at a low speed with a low load. Therefore, when the engine is stopped and there is no engine operation noise, the compressor is operated at a relatively low speed so that the operation noise of the compressor is less annoying. Meanwhile, when the engine is operated, the operation noise caused by the high speed operation of the compressor is masked by the engine operation noise. Therefore, when the compressor is operated at a relatively high speed, the operation noise of the compressor is less annoying.

In a hybrid vehicle, when the remaining capacity of the battery is small for example, the engine begins to drive the generator to charge the battery. When the number of revolutions of the compressor is increased, the remaining capacity of the battery is reduced by the power consumption increase, which is more likely to cause starting of the engine to charge the battery. Therefore, when the engine is stopped, the compressor is operated at a relatively low speed to reduce power consumption, to prevent the engine from starting and thus charging the battery.

According to a tenth aspect of the invention, the target number of revolutions is higher at a high vehicle speed than at a low vehicle speed. In this way, the compressor is operated at a relatively low speed when the automobile drives at a low speed with a little road noise, so that the operation noise of the compressor is less annoying. Meanwhile, the operation noise caused by high speed operation of the compressor is masked by the engine operation noise when the automobile is driven at a high speed with a lot of road noise. Therefore, when the compressor is operated at a relatively high speed, the operation noise of the compressor is less annoying.

In the hybrid vehicle, the possibility of the engine being operated is greater during high speed driving than during low speed driving. Therefore, when there is a high possibility that the engine will be operated, the target number of revolutions can be set to be relatively high, and the same effect as in the ninth aspect can be provided.

According to an eleventh aspect of the invention, the prescribed period can be changed depending upon whether or not the engine is operated.

According to a twelfth aspect of the invention, the prescribed period can be changed based on the vehicle speed.

Incidentally, the parenthesized numerals accompanying the foregoing individual aspects correspond with the embodiments described in the detailed description.

BRIEF DESCRIPTION OF THE DRAWINGS

FIG. 8A is a diagram showing a membership function based on which a target compressor revolution number is obtained;

FIG. 8B is a diagram showing a membership function based on which a target compressor revolution number is obtained;

FIG. 9 is a table showing rules according to which a target compressor revolution number is obtained;

DETAILED DESCRIPTION OF THE PREFERRED EMBODIMENTS

Figure 1:
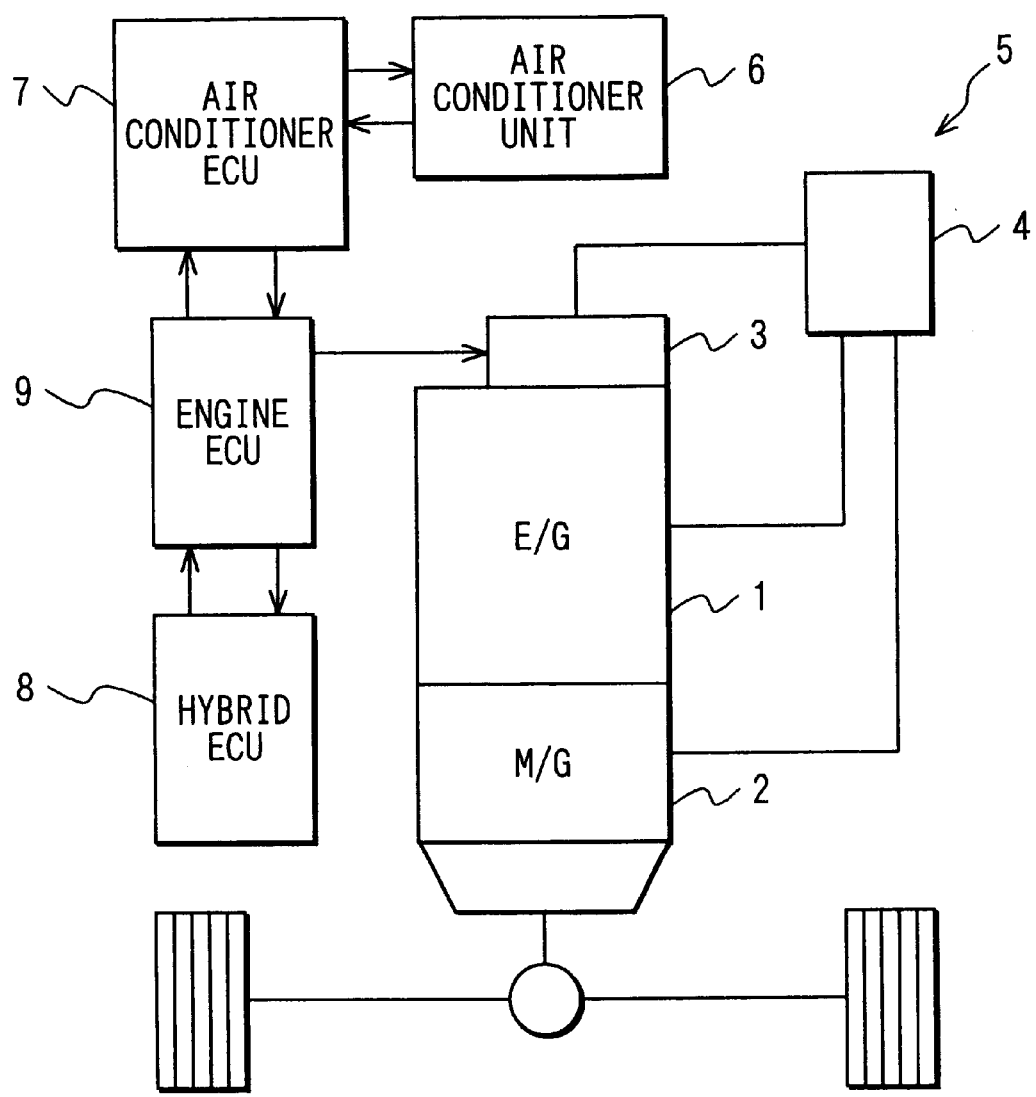
FIG. 1 is a diagram showing the configuration of a hybrid vehicle to which an air-conditioning system according to an embodiment of the present invention is applied.
Figure 2:
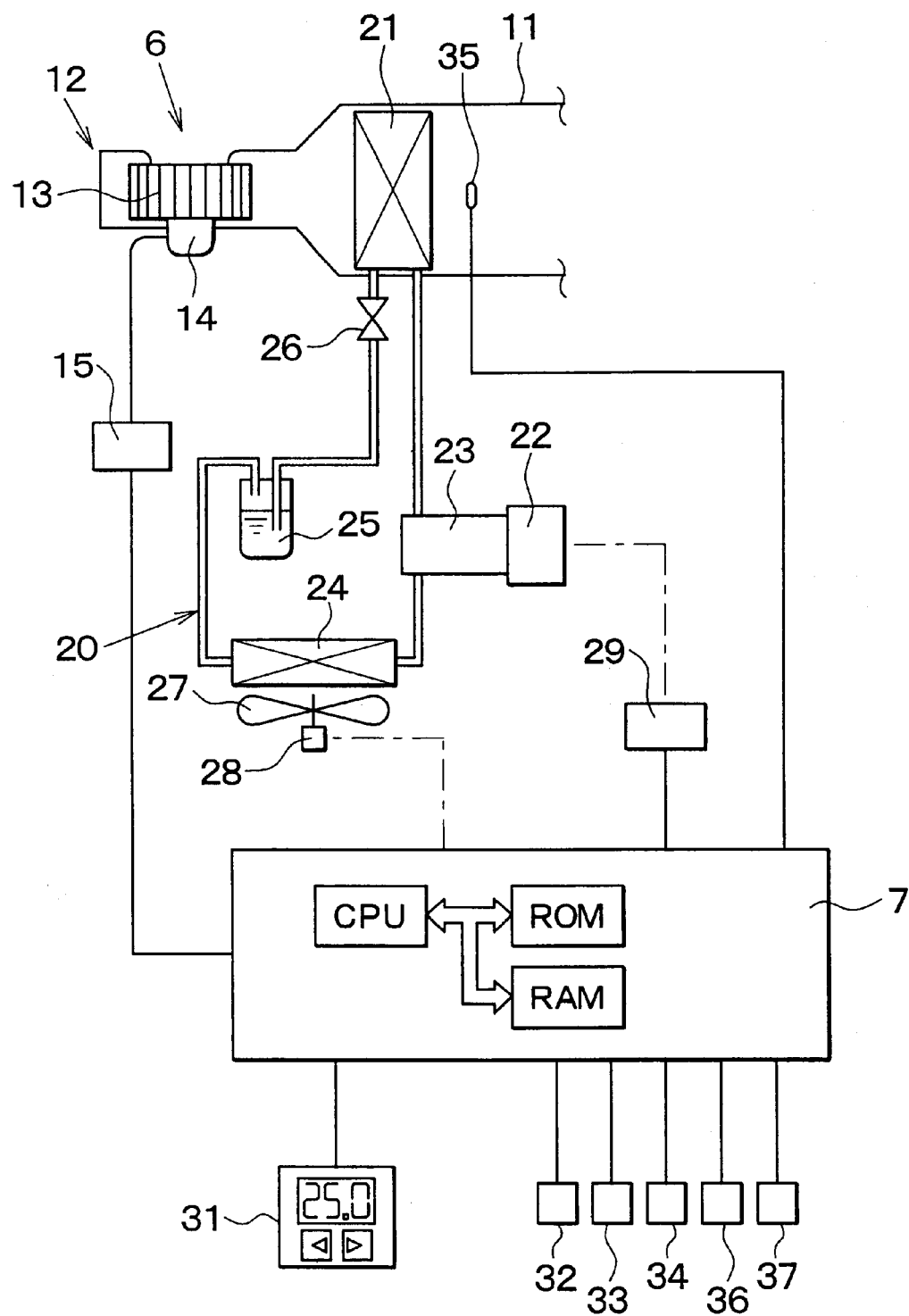
FIG. 2 is a diagram of the overall configuration of the air-conditioning system for the hybrid vehicle in FIG. 1.
Figure 3:
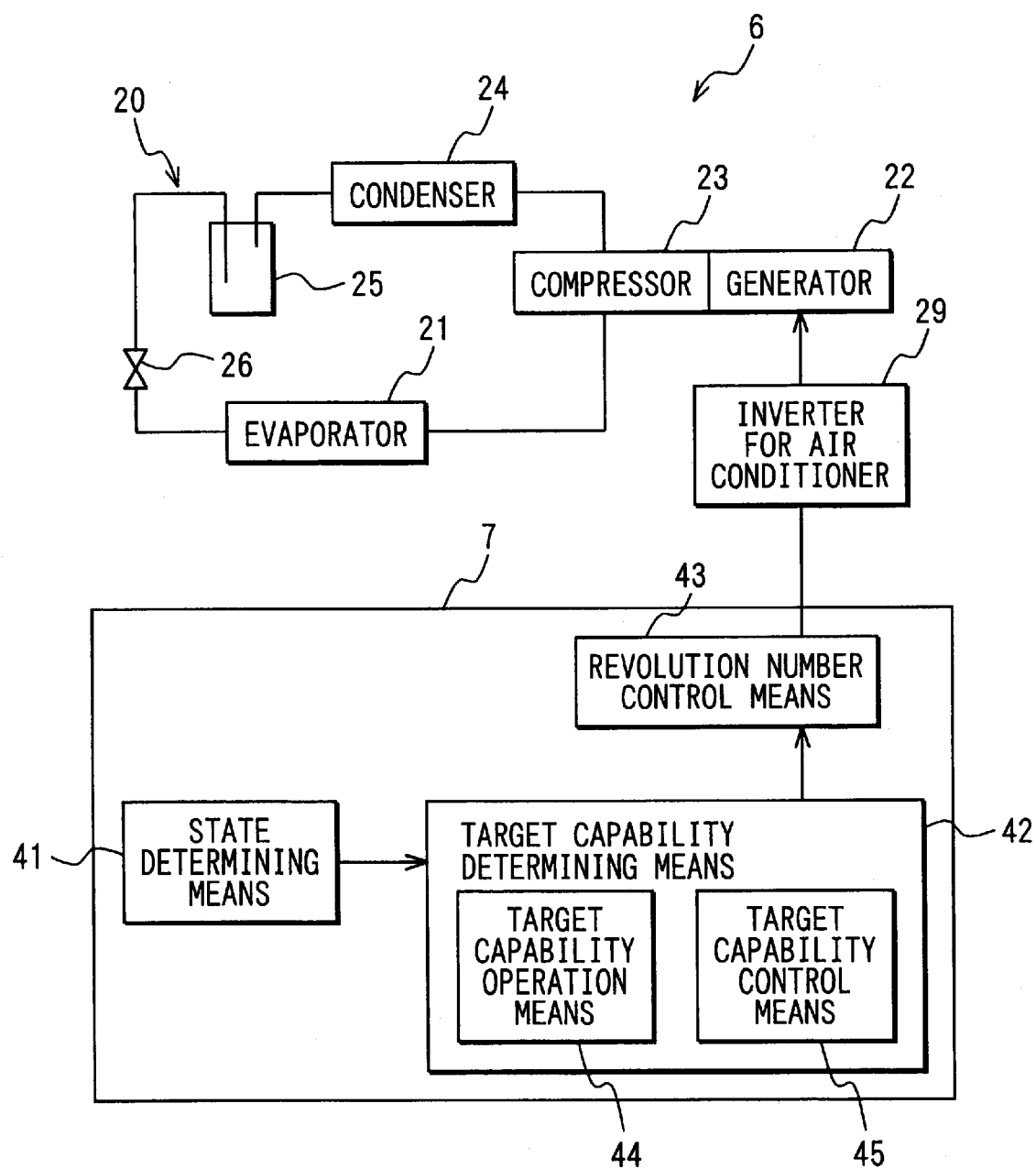
FIG. 3 is a block diagram showing the configuration of an air conditioner ECU in FIG. 1.

FIGS. 1 to 3 show an application of a vehicle air-conditioning system according to an embodiment of the invention applied to a hybrid vehicle. FIG. 1 is a schematic diagram of the configuration of the hybrid vehicle, and FIG. 2 is a diagram of the overall configuration of the air-conditioning system for the hybrid vehicle.

The air-conditioning system for the hybrid vehicle according to the embodiment is an automatic air conditioner that controls each air conditioning means (actuator) of an air conditioner unit 6 for cooling the vehicle compartment of the hybrid vehicle 5 by an electronic control unit, hereinafter, air conditioner ECU 7. In this way, the air conditioner automatically controls the temperature in the vehicle compartment to be kept at a set temperature.

In addition to the above air conditioner unit 6, the hybrid vehicle 5 includes a drive gasoline engine, hereinafter, drive engine 1, a motor generator 2, an engine starter 3, and a vehicle battery 4. The motor generator 2 serves as an electric motor and a generator. The engine starter 3 includes a starter motor for starting the drive engine 1 and an ignition device. The vehicle battery 4 supplies power to the motor generator 2 and the engine starter 3.

The motor generator 2 is driven by the engine 1 to serve as a generator that generates electricity. Meanwhile, the motor generator 2 is fed by the battery 4 to serve as an electric motor that generates driving force for driving the vehicle. Consequently, the motor generator 2 corresponds to both the generator and the electric motor for driving according to the invention.

The drive engine 1 is driven and coupled to the axle of the hybrid vehicle 5 in a disengageable manner. The motor generator 2 is driven and coupled to the axle of the hybrid vehicle 5 in a disengageable manner when the drive engine 1 is not coupled to the axle. The motor generator 2 is automatically controlled, for example, by inverter control, by a hybrid control unit, hereinafter, hybrid ECU 8. Note that the hybrid ECU 8 controls the motor generator 2 to turn on and off so that the hybrid vehicle 5 is moved only by the motor generator 2 when the automobile 5 starts or drives at a low speed.

The engine starter 3 is automatically controlled by an engine control unit, hereinafter, engine ECU 9, so that the gasoline combustion efficiency is optimized. Note that the engine ECU 9 controls the engine starter 3 to turn the engine starter 3 on to operate the drive engine 1 when the hybrid vehicle 5 drives normally or to charge the vehicle battery 4.

The air conditioner unit 6 includes an air conditioning duct 11, a centrifugal blower 12, an evaporator 21, and the like. The centrifugal blower 12 generates airflow toward the vehicle compartment in the air conditioning duct 11. The evaporator 21 cools air passed in the air conditioning duct 11 for cooling the vehicle compartment. The air conditioning duct 11 is provided on the front side of the vehicle compartment of the hybrid vehicle 5 and is formed inside an air passage to guide cool conditioned air into the vehicle compartment of the hybrid vehicle 5.

Note that on the uppermost side upstream of the air conditioning duct 11, there is an inside air inlet (not shown) to draw air into the vehicle compartment, hereinafter "inside air" and an outside air inlet (not shown) to draw air from the is outside, hereinafter "outside air" into the vehicle compartment, and an inside/outside air switch door (not shown) that switches the intake mode. On the lowermost side downstream of the air conditioning duct 11, there is a defroster outlet (not shown), a face outlet (not shown), a foot outlet (not shown), and a mode switch door (not shown) to switch the blowing outlet mode.

The centrifugal blower 12 has a centrifugal fan 13 rotatably stored in a scroll case integrally formed with the air conditioning duct 11, and a blower motor 14 to drive and cause the centrifugal fan 13 to rotate. The blower motor 14 has its blower air quantity (the number of revolutions of the centrifugal fan 14) controlled based on a blower terminal voltage, hereinafter, "blower voltage" applied through a blower driving circuit, that is, a blower driving means 15.

The evaporator 21 corresponds to the heat exchanger for cooling according to the invention and is a component of a refrigeration cycle 20. The evaporator 21 is provided to entirely block the air passage in the air conditioning duct 11. The refrigeration cycle 20 includes a compressor 23, a condenser 24, a receiver 25, an expansion valve 26, the evaporator 21, and a refrigerant pipe. The compressor 23 is driven by an electric motor 22 to rotate and compress a refrigerant gas taken in from the evaporator 21. The condenser 24 condenses and liquefies the refrigerant compressed by the compressor 23. The receiver 25 separates the condensed refrigerant into liquid and gas, and allows only the refrigerant liquid to flow to the downstream side. The expansion valve 26 serves as decompressing means for decompressing and expanding the refrigerant liquid discharged from the receiver 25. The evaporator 21 evaporates and vaporizes the decompressed and expanded refrigerant in a gas-liquid double phase state. The refrigerant pipe connects these components so that the refrigerant can circulate in the refrigeration cycle.

The refrigeration cycle 20 according to the embodiment includes a cooling fan 27 to force outside air, as cooling air, to the condenser 24 to blow, and an electric motor 28 to drive the cooling fan 27 to rotate.

Note that in the refrigeration cycle 20, when the electric motor 22 is in an on state, the power of the electric motor 22 is transmitted to the compressor 23, and air is cooled by the evaporator 21. When the electric motor 22 is cut off from the power supply, the operation of the electric motor 22 is stopped, and the evaporator 21 stops cooling the air.

When the power supplied to the electric motor 22 from the vehicle battery 4 is variably controlled either continuously or step-wise by an inverter for an air conditioner (revolution number control means) 29, the number of revolutions of the electric motor 22 is variably controlled. As the number of revolutions of the electric motor 22 changes, the amount of the refrigerant to be discharged by the compressor 23 is changed to adjust the quantity of refrigerant circulating (flow rate) in the refrigeration cycle 20. In this way, the cooling capability of the evaporator 21 (the cooling capability of the refrigeration cycle 20) is controlled.

Now, the configuration of the control system for the air conditioner unit 6 according to the embodiment will be described in conjunction with FIGS. 1 to 3. FIG. 3 is a block diagram of the configuration of an air conditioner ECU. The air conditioner ECU 7 is provided with communication signals output from the engine ECU 9, switch signals from various switches on a control panel (not shown) provided on the dash board in the vehicle compartment, and sensor signals from various sensors.

The switches on the control panel include a temperature setting switch 31 as temperature setting means for setting the temperature in the vehicle compartment to a desired temperature, an air conditioner switch (not shown) to switch between activation and inactivation of the refrigeration cycle 20 (compressor 23), an air quantity selector switch (not shown) to switch the blower air quantity of the centrifugal fan 13, an intake selector switch (not shown) to switch the intake mode, and a defroster switch 37 to set a defroster mode as the blowing outlet mode.

Note that the air quantity selector switch can switch the blower air quantity of the centrifugal fan 13 at least among OFF, AUTO, LO, ME, and HI. In the defroster mode, blowing air is entirely directed to the glass windows from the defroster outlet, which corresponds to the defogging blowing mode according to the invention.

FIG. 2 shows state detecting means for detecting the air conditioned state (cooled state) in the vehicle compartment. In FIG. 2, an inside air temperature sensor 32 serves as inside temperature detecting means for detecting the temperature of air in the vehicle compartment (inside air temperature). An outside air temperature sensor 33 serves as outside air temperature detecting means for detecting the temperature of air outside the vehicle compartment (outside air temperature). A solar radiation sensor 34 serves as solar radiation detecting means for detecting solar radiation in the vehicle compartment. A post-evaporator temperature sensor 35 serves as air cooled degree detecting means for detecting to what degree air is cooled by the evaporator 21.

Among the above, a thermistor is used for each of the inside air sensor 32, the outside air sensor 33, and the post-evaporator temperature sensor 35. A photodiode is used for the solar radiation sensor 34. More specifically, the post-evaporator temperature sensor 35 serves as the post-evaporator temperature detecting means for detecting the temperature of the air TE immediately after passing the evaporator 21, hereinafter "post-evaporator temperature TE."

As shown in FIG. 2, among the sensors, in order to detect the driving state of the hybrid vehicle 5, a capacity sensor 36 serves as capacity detecting means for detecting the capacity (remaining capacity) of the vehicle battery 4. The capacity of the vehicle battery 4 is measured by measuring the charge and discharge balance of the vehicle battery 4, for example, using a charge and discharge amount measuring device (such as a battery charge counter) that can measure the charged and discharged amount to the vehicle battery 4.

The capacity of the vehicle battery 4 (AH) may be calculated based on the level of discharged current, discharge time, or the temperature or specific gravity of the electrolytic solution, or on a combination thereof. Note that according to the embodiment, when the capacity of the vehicle battery 4 reaches 80% or lower of the fully charged level, an electrical signal is output to the air conditioner ECU 7.

In order to detect the driving state of the hybrid vehicle 5, the engine speed or vehicle speed may be received at the air conditioner ECU 7 through a communication line from an engine speed sensor or a vehicle speed sensor (both not shown) connected to the engine ECU 9.

A microcomputer including a CPU, a ROM, a RAM and the like is provided in the air conditioner ECU 7, and sensor signals from the sensors 32 to 36 are A/D converted by an input circuit (not shown) in the air conditioner ECU 7 and then input to the microcomputer. The air conditioner ECU 7 is supplied with DC current from the vehicle battery 4 when the key switch of the hybrid vehicle 5 is set to the IG position and activated.

Note that the microcomputer according to the embodiment has state determining means 41, target capability determining means 42, and revolution number control means 43. The state determining means 41 is connected to the temperature setting switch 31, the defroster switch 37, and the sensors 32 to 36 through the input circuit and determines the cooling state of the air conditioner unit 6 (such as cooling load) based on information from the switches 31 and 37 and the sensors 32 to 36.

The target capability determining means 42 has target capability operation means 44 for calculating the target cooling capability of the refrigeration cycle 20 based on the cooling state of the air conditioner unit 6 and target capability limiting (control) means 45 for limiting the target cooling capability of the refrigeration cycle 20 to a prescribed value based on the cooling state of the air conditioner unit 6. The target capability determining means 42 determines the target cooling capability based on the outputs from these means 44 and 45.

The revolution number control means 43 controls the number of revolutions of the electric motor 22 of the compressor 23 so that the number of revolutions corresponds to the output of the target capability determining means 42, and outputs a control signal based on the target cooling capability to the inverter 29 for the air conditioner. Note that according to the embodiment, to what degree air is cooled by the evaporator 21 is used as the target cooling capability. More specifically, the number of revolutions of the compressor 23 is controlled so that the post-evaporator temperature TE equals the target value TEO, hereinafter "target post-evaporator temperature TEO."

Figure 4:
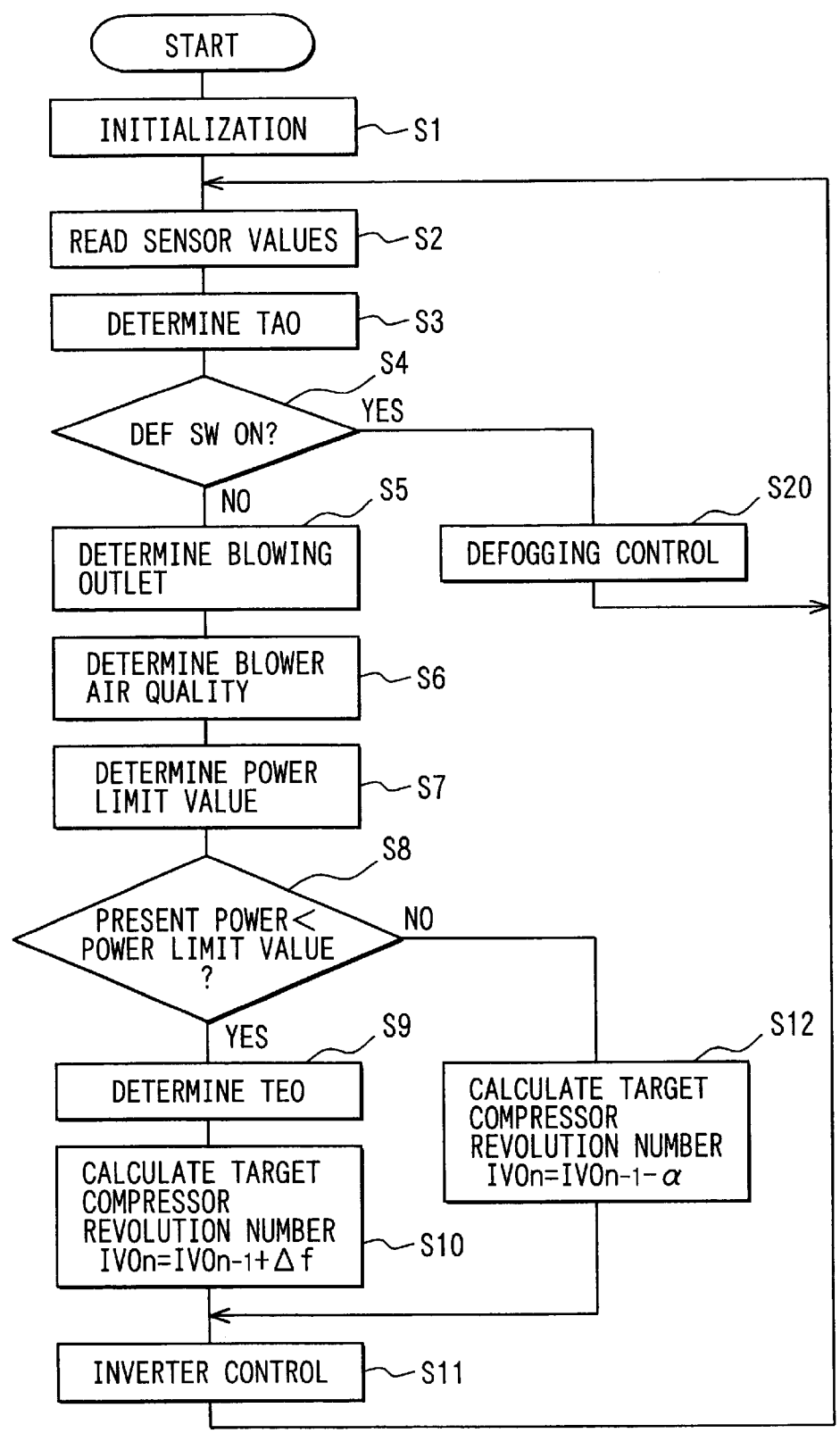
FIG. 4 is a flowchart illustrating control processing by the air conditioner ECU in FIG. 1.
Figure 5:
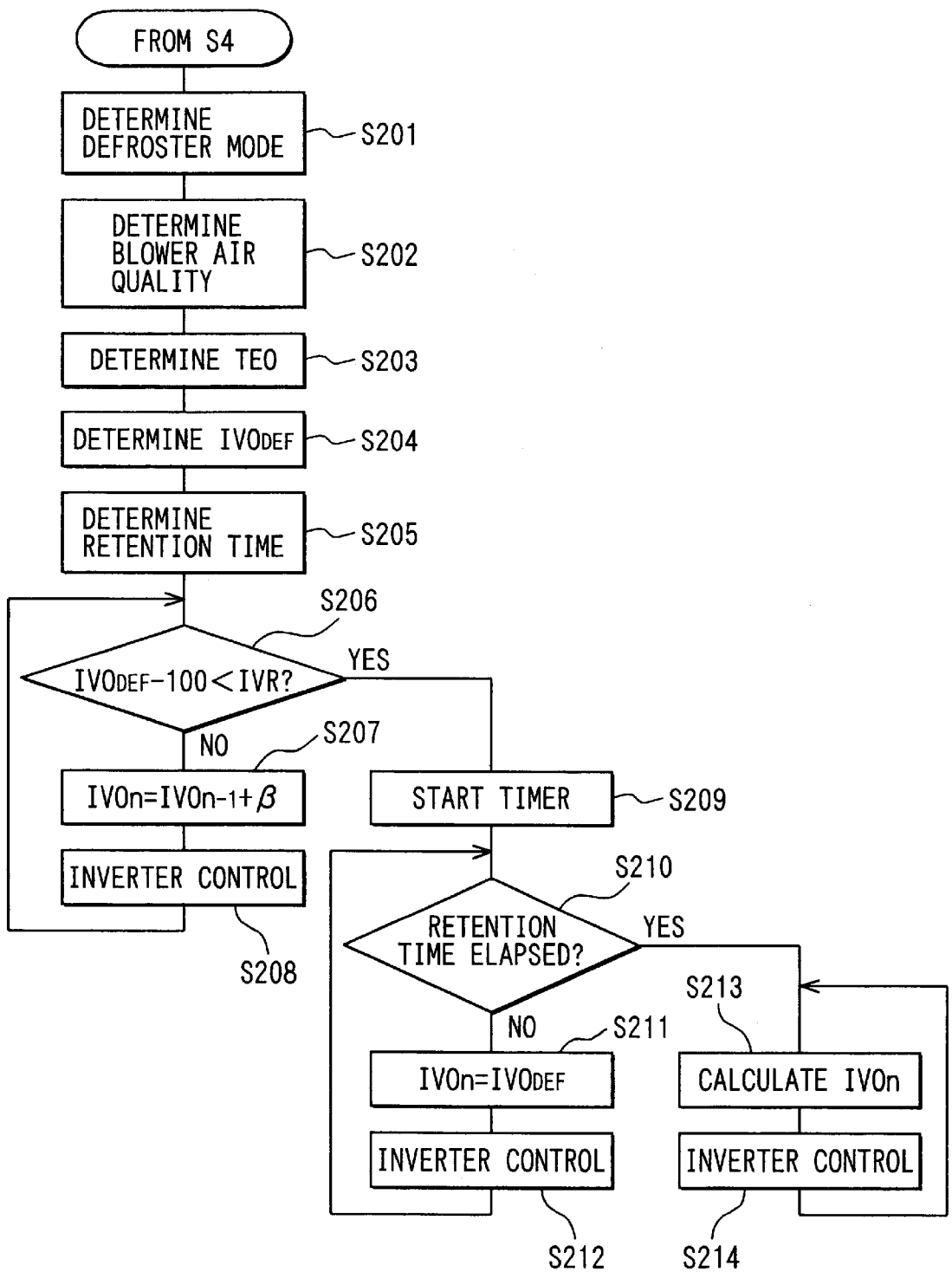
FIG. 5 is a flowchart illustrating control processing in step S20 in FIG. 4.

Now, the operation of the embodiment will be described. FIGS. 4 and 5 are flowcharts for use in illustrating the cooling capability control by the air conditioner ECU 7 (revolution number control of the electric compressor 23). When the key switch is operated to the IG position, the air conditioner ECU 7 is supplied by a DC power supply, and the routine in FIG. 4 is activated. Then in step S1, initialization or initial setting is carried out. Then in step S2, switch signals from various switches such as the temperature setting switch 31 and the air quantity selector switch are read.

In the next step S3, the target blowing temperature TAO of the air blown into the vehicle compartment is calculated based on the set temperature, the inside air temperature, the outside air temperature, and the solar radiation. The target blowing temperature TAO is the temperature of the blowing air necessary for keeping the inside air temperature at a set temperature.

It is then determined in step S4 whether or not the defroster switch 37 has been operated and the defroster mode is selected. If the defroster mode is not selected, the result of the determination in step S4 is NO, and the control proceeds to step S5. In step S5, the blowing outlet mode is determined based on the target blowing temperature TAO.

Then in step S6, the target blower air quantity from the centrifugal fan 13 is calculated based on the target blowing temperature TAO, and the blower voltage to achieve the target blower air quantity is determined.

Figure 6:
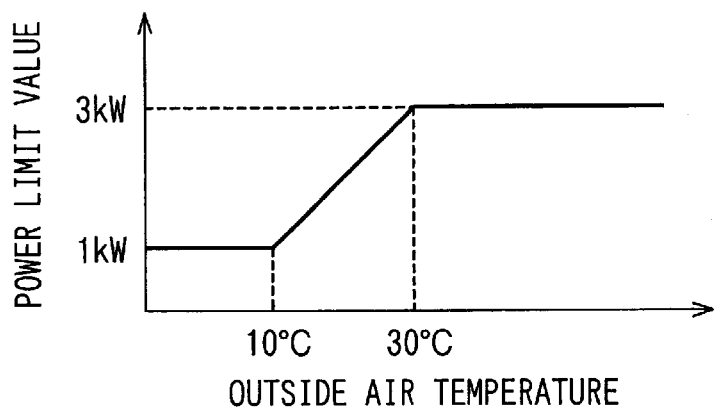
FIG. 6 is a characteristic diagram based on which a power restriction value is obtained.

In step S7, the limit of the power to be used by the electric motor 22 to drive the compressor 23 is determined based on the characteristic diagram of FIG. 6. According to the embodiment, in normal control for blowing outlet modes other than the defroster mode, as denoted by the solid line in FIG. 6, the power limit value is set to 1 kW at an outside air temperature of 10° C. or lower. The power limit value is set to 3 kW at an outside air temperature of 30° C. or higher. The power limit value is gradually increased as the outside air temperature rises from 10° C. to 30° C.

Then in step S8, the power of the electric motor 22 being used at present and the power limit value determined in step S7 are compared. When the power of the electric motor 22 being used at present is less than the power limit value, the result of the determination in step S8 is YES, and the control proceeds to step S9.

Figure 7:
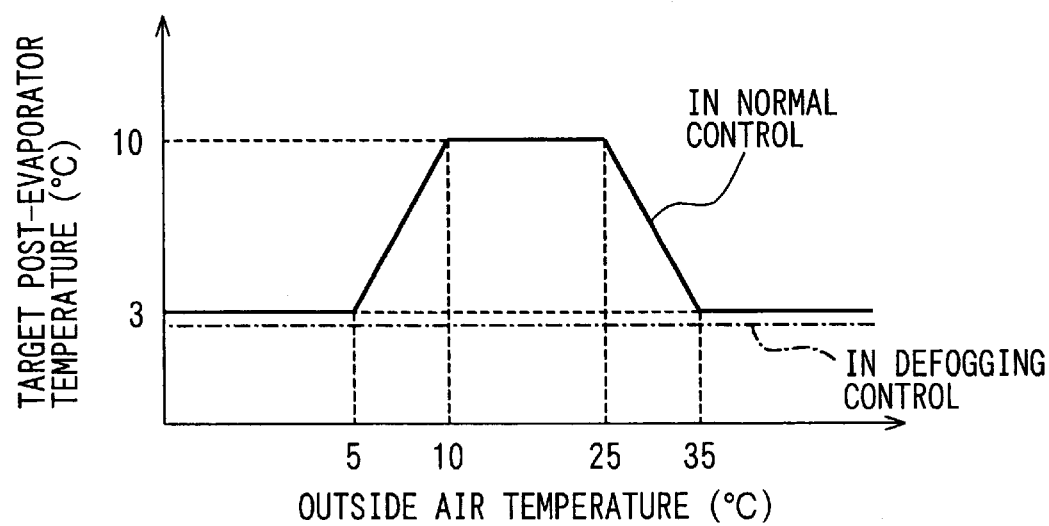
FIG. 7 is a characteristic diagram based on which a target post-evaporator temperature is obtained.

In step S9, the target post-evaporator temperature TEO is determined based on the characteristic diagram of FIG. 7. According to the embodiment, in normal control for blowing outlet modes other than the defroster mode, as denoted by the solid line in FIG. 7, the target post-evaporator temperature TEO is set to 3° C. when the outside air temperature is 5° C. or lower and 35° C. or higher. When the outside air temperature rises from 10° C. to 25° C., the target post-evaporator temperature TEO is set to 10° C. When the outside air temperature rises from 5° C. to 10° C., the target post-evaporator temperature TEO is gradually increased as the outside air temperature rises. When the outside air temperature rises from 25° C. to 35° C., the target post-evaporator temperature TEO is gradually reduced as the outside air temperature rises.

Then in step S10, the target revolution number IVOn of the compressor 23 is obtained as follows. The deviation En between the target post-evaporator temperature TEO and the post-evaporator temperature TE is calculated from the following expression (1):

$$En = TEO - TE \tag{1}$$

Then, deviation change rate Edot is calculated from the following expression (2):

$$Edot = En - En - 1 \tag{2}$$

wherein En−1 is the previous value for the deviation En, and the deviation En is updated every four seconds, in other words, the previous value En−1 is the deviation value En four seconds earlier.

Based on the membership function in FIGS. 8A and 8B stored in the ROM and rules in FIG. 9, the target revolution number increase Δf (rpm) for the deviation En and the deviation change ratio Edot is calculated. Herein, the target revolution number increase Δf is the revolution number increase and decrease of the compressor 23 from the previous target compressor revolution number IVOn−1, i.e., the target compressor revolution number four seconds earlier.

More specifically, based on CF1 produced by FIG. 8A and CF2 produced by FIG. 8B, an input adaptation degree CF is produced from the following expression (3). Then, based on the input adaptation degree CF and the rule values in FIG. 9, the target revolution number increase Δf is calculated from the following expression (4).

$$CF = CF1 \times CF2 \tag{3}$$

$$\Delta f = \Sigma (CF \times \text{rule value}) / \Sigma CF \tag{4}$$

Then, the target compressor revolution number IVOn is calculated based on the following expression (5):

$$IVOn = IVOn - 1 + \Delta f \tag{5}$$

wherein if En=−2.5 (°C.), and Edot=−0.35 (°C./4 sec), NB=0, NS=0.5, ZO=0.5, PS=0, PB=0 from FIG. 8A, while NB=0, NS=0.5, ZO=0.5, PS=0, PB=0 from FIG. 8B.

Therefore, the denominator, ΣCF in the expression (4) can be as follows:

ΣCF=0.5×0.5+0.5×0.5+0.5×0.5+0.5×0.5=1

Meanwhile, the numerator, Σ(CF×rule value) in the expression (4) can be as follows:

Σ(CF×rule value)=0.5×0.5×80+0.5×0.5×100+0.5×0.5×150+0.5× 0.5×0=82.5

Based on these results, Δf=82.5. Therefore, the target compressor revolution number IVOn is increased by 82.5 (rpm) from the previous target compressor revolution number IVOn−1 four seconds earlier.

Note that in the rule table in FIG. 9, the blank spaces are not subject to calculations by the above expressions (3) and (4). When ΣCF=0, Δf=0.

After the target compressor revolution number IVOn is obtained in step S10, the control proceeds to the next step S11, and in step S11, the current input to the inverter 29 is controlled so that the number of revolutions of the compressor 23 equals the target compressor revolution number IVOn. In this way, by controlling the inverter 29 to turn on and off, the post-evaporator temperature TE approaches the target post-evaporator temperature TEO.

Meanwhile, when the result of the determination in step S8 is NO, in other words, when the power of the electric motor 22 being used at present is equal to or larger than the power limit value, the control proceeds to step S12, and in step S12, the target compressor revolution number IVOn is calculated from the following expression (6):

$$IVOn = IVOn-1-\alpha \qquad (6)$$

wherein α is the target revolution number decrease which corresponds to the revolution number decrease of the compressor 23 from the previous target compressor revolution number IVOn−1. The target revolution number decrease α is determined as follows. As shown in the table in FIG. 10, α is determined based on the excess amount of power beyond the power limit value being used at present by the electric motor 22. When the excess amount is less than 100 W, α=0. When the excess amount is from 100 W to 300 W, α=200 rpm. When the excess amount is more than 300 W, α=500 rpm.

After the target compressor revolution number IVOn is obtained in step S12 as described above, the control proceeds to step S11, and the inverter 29 is controlled so that the number of revolutions of the compressor 23 equals the target compressor revolution number IVOn. In this way, the power consumed by the electric motor 22 is substantially equal to or lower than the power limit value.

Figures 10, 11:
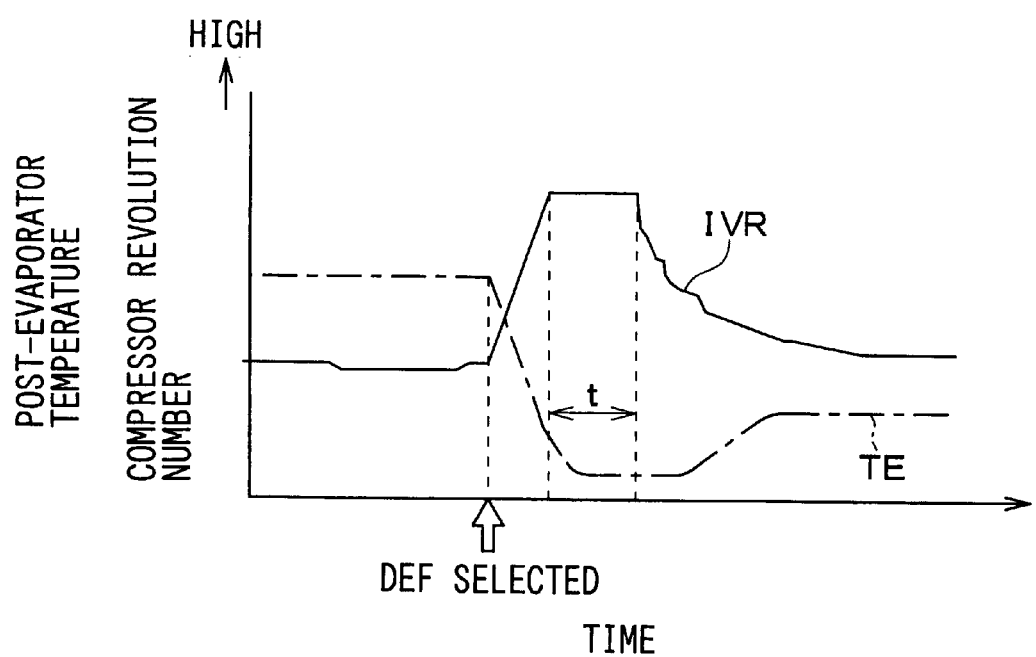
FIG. 10 is a table to obtain a target revolution number reduction.
FIG. 11 is a graph showing the number of revolutions of a compressor in defogging control and an example of how the post-evaporator temperature is controlled.

Meanwhile, when the result of the determination in step S4 is YES, in other words, when the defroster switch 37 is operated to select the defroster mode, the control proceeds to step S20, and defogging control is carried out. In this defogging control, the limit on the power consumption by the electric motor 22 is lifted and control with priority for securing the field of view over power saving is carried out. Note that FIG. 5 is a detailed flowchart for use in illustrating control in step S20, FIG. 11 shows an example of how to control the number of revolutions of the compressor 23 and the post-evaporator temperature TE in the defogging control.

In FIG. 5, the blowing outlet mode is determined in the defroster mode in step S201. Then, in step S202, the target blower air quantity is calculated based on the target blowing temperature TAO, and then the blower voltage to achieve the target blower air quantity is determined. Note that the target blower air quantity in the defroster mode is preferably set to be larger than those in the other blowing outlet modes.

Then, in step S203, the target post-evaporator temperature TEO is determined. According to the embodiment, in the defogging control in the defroster mode, the target post-evaporator temperature TEO is set to 3° C. as denoted by the chain-dotted line in FIG. 7 regardless of the outside air temperature.

In step S204, the target compressor revolution number $IVO_{DEF}$ in the defroster mode, hereinafter, "defroster target compressor revolution number $IVO_{DEF}$" is determined. More specifically, the defroster target compressor revolution number $IVO_{DEF}$ is set to be higher as the outside air temperature rises.

In step S205, the time t, during which the compressor 23 is operated as its number of revolutions is maintained at the defroster target compressor revolution number $IVO_{DEF}$, is determined. Stated differently, the time t to maintain the defroster target compressor revolution number $IVO_{DEF}$ is determined. As the outside air temperature rises, the retention time t is set to be longer.

It is then determined in step S206 whether or not the real revolution number IVR of the compressor 23, hereinafter "real compressor revolution number IVR," has approached the defroster target compressor revolution number $IVO_{DEF}$ based on the comparison between them. If the real compressor revolution number IVR is smaller than the defroster target compressor revolution number $IVO_{DEF}$ by at least 100 rpm, the result of the determination in step S206 is NO, and the control proceeds to step S207.

In step S207, the target compressor revolution number IVOn is calculated based on the following expression (7):

$$IVOn = IVOn-1+\beta \qquad (7)$$

wherein β is a target value for the revolution number increase of the compressor 23 to be raised for four seconds. The target revolution number increase β corresponds to the increase in the number of revolutions of the compressor 23 after four seconds when the electric motor 22 is supplied with the maximum limit of power, in other words, when the number of revolutions of the compressor 23 is raised at the maximum increasing speed.

Then, the control proceeds to step S208 and in step S208, the inverter 29 is controlled so that the number of revolutions of the compressor 23 equals the target compressor revolution number IVOn. Steps S207 and S208 are repeated until the real compressor revolution number IVR gets closer to the defroster target compressor revolution number $IVO_{DEF}$ and the result of the determination in S206 is YES. In this way, as shown in FIG. 11, the compressor 23 has its number of revolutions increased at the maximum increasing speed for the number of revolutions after the defroster mode is selected until the real compressor revolution number IVR gets closer to the defroster target compressor revolution number $IVO_{DEF}$.

In this way, by raising the number of revolutions of the compressor 23 at the maximum increasing speed, the post-evaporator temperature TE is rapidly lowered, so that the dehumidifying and cooling capability can quickly be raised to a higher level. If the real compressor revolution number IVR comes closer to the defroster target compressor revolution number $IVO_{DEF}$, and the result of the determination in step S206 is YES, the control proceeds to step S209 to start the timer, and then the control proceeds to step S210.

It is determined in step S210 whether or not the retention time t determined in step S205 has passed, and the result of the determination in step S210 continues to be NO until the retention time t elapses, and the control proceeds to step S211.

In step S211, the target compressor revolution number IVOn is set to the defroster target compressor revolution number $IVO_{DEF}$. Then, the control proceeds to step S212 where the inverter 29 is controlled so that the number of revolutions of the compressor 23 equals the target compressor revolution number IVOn.

Consequently, as shown in FIG. 11, until the retention time t elapses, the number of revolutions of the compressor 23 is controlled substantially by the defroster target compressor revolution number $IVO_{DEF}$. In this way, the post-evaporator temperature TE is kept at a low level, in other words, the dehumidifying and cooling capability is kept at a high level for a prescribed period. The retention time t is set to a period sufficient for removing the fog from the glass windows.

After the retention time t, the result in step S210 becomes YES, and the control proceeds to step S213. In step S213, similarly to step S10 described above, the target revolution number IVOn of the compressor 23 is obtained. Then in the next step S214, the inverter 29 is controlled so that the number of revolutions of the compressor 23 equals the target compressor revolution number IVOn.

Note that when a blowing outlet mode other than the defroster mode is selected by operation of the defroster switch 37 during defogging control, the defogging control is stopped and the control returns to normal control. According to the embodiment, when the defogging blowing mode is selected, the function of securing the field of view has priority over the power saving function. Therefore, the number of revolutions of the compressor 23 is increased to raise the dehumidifying and cooling capability, so that the fog can quickly be removed from the window.

When the defogging blowing mode is selected, the compressor 23 continues to be operated in a high revolution number range for a prescribed time period, so that the dehumidifying and cooling capability is kept at a high level for the period. In this way, the fog can be removed from the window even more quickly.

When the defogging blowing mode is selected, the number of revolutions of the compressor 23 is raised to the target revolution number at the maximum increasing speed for the number of revolutions, and therefore the dehumidifying and cooling capability can quickly be raised to a higher level, and the fog can be removed from the windows even more quickly.

Other Embodiments

In the above embodiment, the limit on the electric power used by the electric motor 22 is lifted only in the defroster mode, so that the defogging control in consideration of securing the field of view with priority over power saving is carried out. Meanwhile, in the foot defroster mode in which approximately equal amounts of air are blown from the defroster outlet and the foot outlet, the defogging control can also be carried out. In this case, the foot defroster mode also corresponds to the defogging blowing mode according to the invention.

According to the above embodiment, the defroster target compressor revolution number $IVO_{DEF}$ in the defroster mode is determined based on the outside air temperature, but the number of revolutions $IVO_{DEF}$ may be determined based on the temperature of the glass windows, or the humidity in the vehicle compartment, or based on multiple conditions among the outside air temperature, the temperature of the glass windows, and the humidity in the vehicle compartment.

In the above embodiment, the retention time t in the defroster mode is determined based on the outside air temperature, but the time t can be determined based on the temperature of the glass windows or the humidity in the vehicle compartment or based on multiple conditions among the outside air temperature, the temperature of the glass windows, and the humidity in the vehicle compartment. Alternatively, the retention time t does not have to be provided at all.

In the hybrid vehicle having the drive engine 1 and the motor generator 2, the defroster target compressor revolution number $IVO_{DEF}$, the retention time t, and the increasing speed for the number of revolutions of the compressor 23 in the defroster mode may be changed depending upon whether the drive engine 1 is stopped or operated.

When the engine 1 is stopped and there is no engine operation noise, the defroster target compressor revolution number $IVO_{DEF}$, and the increasing speed for the number of revolutions of the compressor 23 may be reduced, so that the operation noise of the compressor 23 may be less annoying. Meanwhile, when the engine is operated, the operation noise caused by high speed operation of the compressor 23 is masked by the engine operation noise. Therefore, when the defroster target compressor revolution number $IVO_{DEF}$ and the increasing speed for the number of revolutions of the compressor 23 are increased, the operation noise of the compressor 23 may be less annoying. Note that the retention time t is set to be long while the engine is stopped and short while the engine is operated.

In the hybrid vehicle having the drive engine 1 and the motor generator 2, the defroster target compressor revolution number $IVO_{DEF}$, the retention time t, and the increasing speed for the number of revolutions of the compressor 23 in the defroster mode may be changed depending upon the speed of the automobile.

When the automobile is driven at a low speed with a little road noise, the increasing speed for the number of revolutions of the compressor 23 may be low so that the operation noise of the compressor 23 may be less annoying.

Alternatively, when the automobile drives at a high speed with a lot of road noise, the operation noise caused by high speed operation of the compressor 23 is masked by the engine operation noise. Therefore, when the defroster target compressor revolution number $IVO_{DEF}$ and the increasing speed for the number of revolutions of the compressor 23 are increased, the operation noise of the compressor 23 may be less annoying. Note that the retention time t is set to be long while the engine is stopped and short while the engine is operated.

What is claimed is:

1. A vehicle air-conditioning system comprising:
   a compressor for compressing a refrigerant and discharging the compressed refrigerant;
   an electric motor for driving said compressor; and
   a heat exchanger for cooling air blown into a vehicle compartment by said refrigerant, electric power used by said electric motor being limited in a prescribed condition, wherein
   the limit on the electric power used by the electric motor is lifted when a defogging blowing mode to blow said air to glass windows is selected.

2. The vehicle air-conditioning system according to claim 1, wherein when said defogging blowing mode is selected, the number of revolutions of said compressor is increased to a target number of revolutions, and then held at said target number of revolutions for a prescribed period.

3. The vehicle air-conditioning system according to claim 2, wherein when said defogging blowing mode is selected, the number of revolutions of said compressor is increased to said target number of revolutions at a maximum increasing speed for the number of revolutions.

4. The vehicle air-conditioning system according to claim 2, wherein said prescribed period is determined based on at least one of a temperature of outside air, a temperature of said glass windows, and humidity in said vehicle compartment.

5. The vehicle air-conditioning system according to claim 3, wherein said prescribed period is determined based on at least one of a temperature of outside air, a temperature of said glass windows, and humidity in said vehicle compartment.

6. The vehicle air-conditioning system according to claim 2, wherein said target number of revolutions is determined based on at least one of a temperature of outside air, a temperature of said glass windows, and humidity in said compartment of the vehicle.

7. The vehicle air-conditioning system according to claim 3, wherein said target number of revolutions is determined based on at least one of a temperature of outside air, a temperature of said glass windows, and humidity in said compartment of the vehicle.

8. The vehicle air-conditioning system according to claim 4, wherein said target number of revolutions is determined based on at least one of a temperature of outside air, a temperature of said glass windows, and humidity in said compartment of the vehicle.

9. A vehicle air-conditioning system comprising:

a compressor for compressing a refrigerant and discharging the compressed refrigerant;

an electric motor for driving said compressor, said electric motor driven by a battery; and a heat exchanger for cooling air using said refrigerant, said air blown into a vehicle compartment, wherein the electric power used by said electric motor for said compressor is not limited when a defogging blowing mode is selected to blow air to vehicular glass windows.

10. The vehicle air-conditioning system according to claim 9, wherein when said defogging blowing mode is selected, the number of revolutions of said compressor is increased to a target number of revolutions and held at said target number of revolutions for a prescribed period.

11. The vehicle air-conditioning system according to claim 10, wherein when said defogging blowing mode is selected, the number of revolutions of said compressor is increased to said target number of revolutions at a maximum increasing speed for the number of revolutions.

12. The vehicle air-conditioning system according to claim 11, wherein said target number of revolutions is set to a higher level while said engine is operated than while said engine is stopped.

13. The vehicle air-conditioning system according to claim 10, wherein said target number of revolutions is higher at a high vehicle speed than at a low vehicle speed.

14. The vehicle air-conditioning system according to claim 11, wherein said target number of revolutions is higher at a high vehicle speed than at a low vehicle speed.

15. The vehicle air-conditioning system according to claim 10, wherein said prescribed period is changed based on whether or not said engine is operated.

16. The vehicle air-conditioning system according to claim 14, wherein said prescribed period is changed based on whether or not said engine is operated.

17. The vehicle air-conditioning system according to claim 13, wherein said prescribed period is changed based on the vehicle speed.

18. A vehicle air-conditioning system comprising:

a compressor for compressing a refrigerant and discharging the compressed refrigerant;

an electric motor for driving said compressor; and a heat exchanger for cooling air blown into a compartment of a vehicle by said refrigerant, wherein electric power used by said electric motor is limited in a prescribed condition, wherein the electric power used by said electric motor is greater when an instruction of defogging vehicle glass windows is issued in said prescribed condition than that when there is no such defogging instruction.

* * * * *